United States Patent
Thomas

[15] 3,679,029
[45] July 25, 1972

[54] SHOCK ABSORBER EXTENSION

[72] Inventor: James H. Thomas, c/o Mr. Genuine Suspension, 866 W. 16th St., Newport Beach, Calif. 92660

[22] Filed: April 21, 1971

[21] Appl. No.: 135,887

[52] U.S. Cl. .............................................. 188/321, 287/111
[51] Int. Cl. .......................................................... F16f 9/54
[58] Field of Search .............. 188/321; 287/11; 285/373, 419

[56] References Cited

UNITED STATES PATENTS 595,196  12/1897  Newman et al. ................... 287/111 X
1,150,564  8/1915  Walker ................................. 188/321

Primary Examiner—George E. A. Halvosa
Attorney—George A. Maxwell

[57] ABSTRACT

An extension to be engaged with one end of an elongate cylinder and piston type shock absorber to facilitate engaging said shock absorber with and between its normally related relatively shiftable structures upon increasing the normal spacing apart of said structures; said extension being such that it remains in axial alignment with the shock absorber, requires no modification of the shock absorber to effect its connection therewith and connects with standard shock absorber mounting means without alteration or modification thereof.

10 Claims, 10 Drawing Figures

Patented July 25, 1972  3,679,029
2 Sheets-Sheet 1
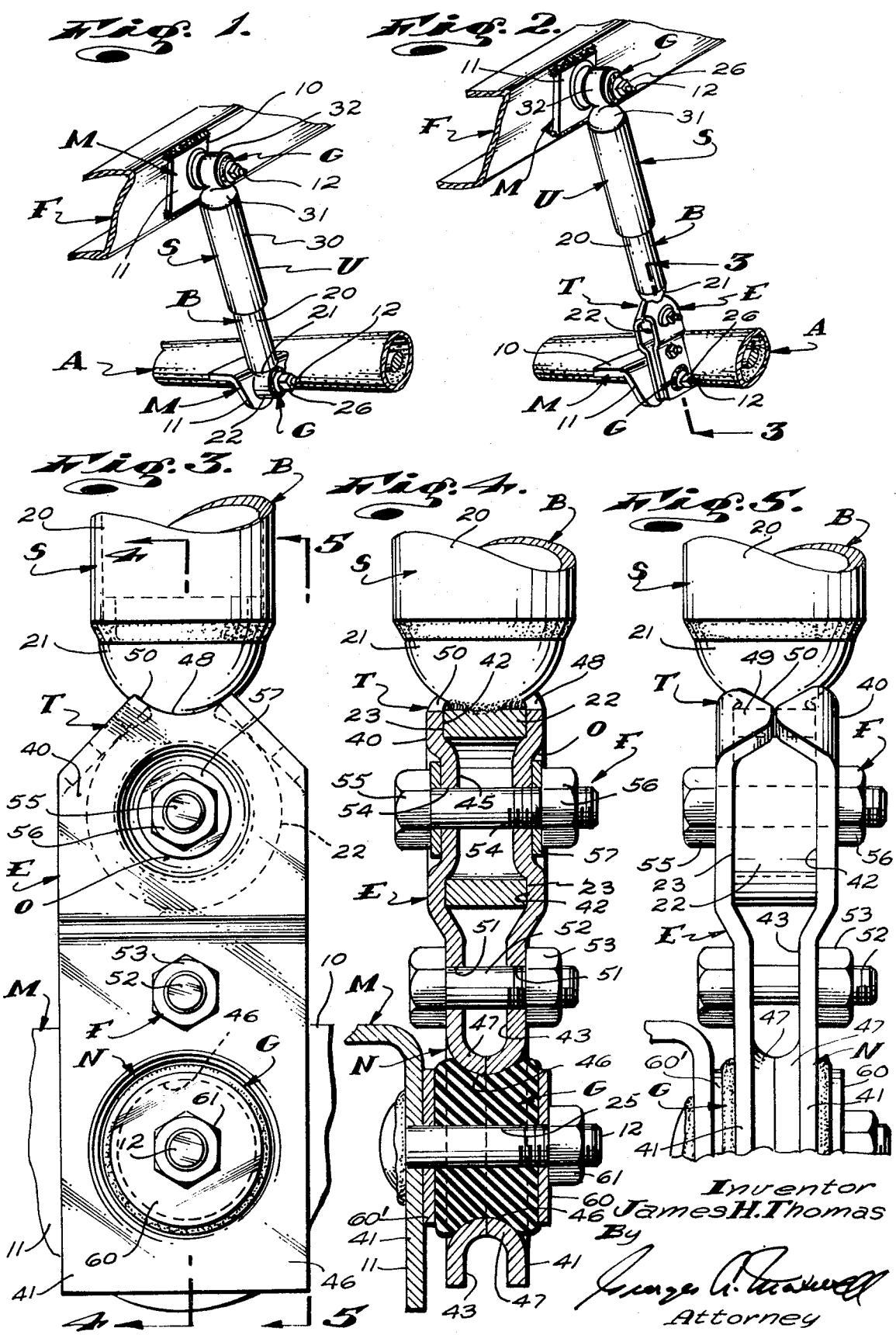
Inventor
James H. Thomas
By
George A. Purwell
Attorney

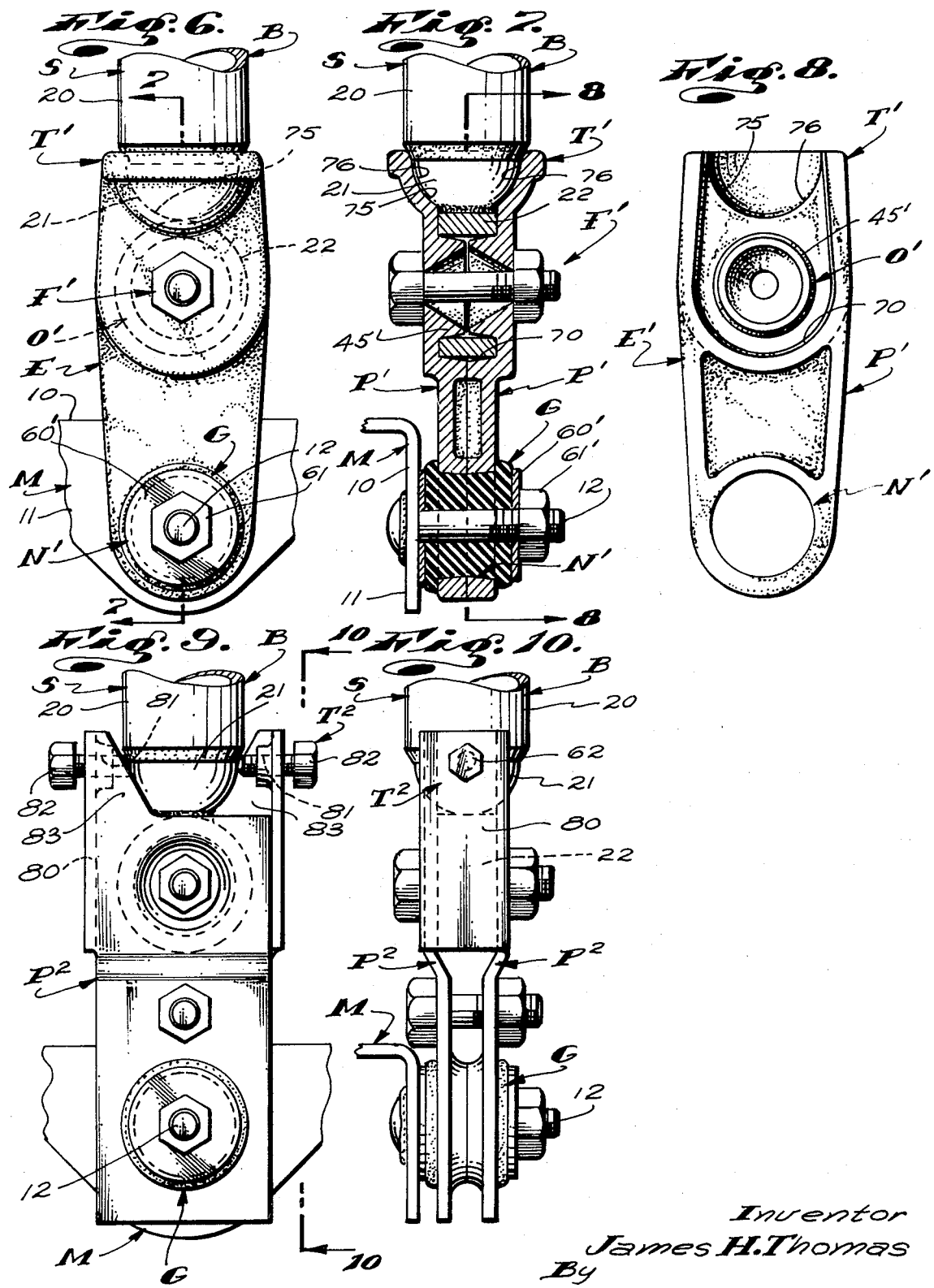

SHOCK ABSORBER EXTENSION

This invention has to do with automobile suspension means and is more particularly concerned with means for extending the effective longitudinal extent of standard shock absorbers for use in modified suspension systems.

In the automotive art, automobiles are provided with suspension systems, between their frames or chassis and their supporting wheels, to provide soft, comfortable riding characteristics when the automobiles are operated by ordinary drivers on ordinary roadways and the like.

Included in such suspension systems are elongate, cylinder and piston type shock absorbers, which shock absorbers serve to slow and/or dampen vertical movement between the wheels and frames of the vehicles. Shock absorbers of the character referred to are standardized components, there being a relatively few different makes and sizes and each varying little in basic makeup and design from the other. The ordinary or standard shock absorber construction has, on at least one of its ends, a mounting ring, which ring is fixed directly to a semi-spherical or crowned caplike end on the shock absorber cylinder or on a cylindrical shell carried by the shock absorber piston or piston rod. Such mounting rings are of standard axial, inside and outside diametric extent, are arranged with their axes normal to the longitudinal axes of the shock absorbers and are adapted to cooperatively receive or engage a mounting stud or shaft-like part on their related part of the vehicle and to effect a pivotal connection between the shock absorber and that said part of the vehicle.

In the automotive art, it is common practice to modify or alter the suspension systems of automobiles for competition events and use. Such modifications are carried out to effect a desired redistribution of weight onto the wheels of the automobiles and/or to enhance the steering, cornering and/or handling characteristics for the special use to which the automobiles are to be put.

The most common modification of automobile suspension systems, for competition purposes, involves raising or lifting the rear ends of the automobile chassis or frames above the rear axles and wheels of the vehicles. In many modifications, the front ends of the vehicle frames are also raised or lifted.

When the automobile frames are raised or lifted, in the above referred to manner, the distance between the original and existing shock absorber mounting means on the vehicle parts and with which the shock absorbers are intended to be secured is increased substantially and beyond or in excess of the effective longitudinal extent of standard shock absorbers.

As a result of the above, when the suspension of automobiles are modified, as indicated, new, especially made or modified, longer and costly shock absorbers must be substituted for the standard shock absorbers, or the mounting means therefor, on related parts of the automobile, must be modified in some suitable manner so that the standard shock absorbers can be utilized. Such modifications of shock absorber mounting means requires special, time consuming and costly rebuilding of the mounting means be undertaken, which rebuilding is not readily or easily undone or altered and has all to frequently been found to be unsound and a source of great danger or hazard.

An object of my invention is to provide shock absorber extensions whereby standard shock absorbers can be advantageously and effectively utilized in modified or lifted automobile suspension systems, without modification or alteration of the shock absorbers and/or the shock absorber mounting means on the automobile parts related thereto.

It is an object and feature of my invention to provide shock absorber extensions which are easy and economical to manufacture, easy and economical to install and which are highly effective, dependable in operation and safe to use.

It is an object and feature of the present invention to provide means to extend the effective longitudinal extent of standard shock absorbers which means comprises a pair of elongate plate-like parts having means at their opposite ends to cooperatively engage the mounting rings on the ends of the shock absorbers related thereto and the shock absorber mounting means on the automobile parts related thereto; fastening means releasably securing the plate-like parts together and engaged with the said rings and mounting means; and, stop means engageable with the shock absorbers to stop and prevent pivoting and/or mis-alignment between said plate-like parts and the shock absorbers.

The above and other objects and features of the present invention will be understood and become apparent from the following detailed description of typical preferred forms and embodiments of my invention throughout which description reference is made to the accompanying drawings, in which:

FIG. 1 is an isometric view of portions of two, typical, vertically spaced automobile parts with related shock absorber mounting means, in normal spaced relationship and with a standard shock absorber engaged therewith;

FIG. 2 is an isometric view similar to FIG. 1 showing the vertical spacing of automobile parts increased and showing the shock absorber extension that I provide engaged with and between one end of the shock absorber and the shock absorber mounting means on the automobile part related thereto;

FIG. 3 is an enlarged view of the extension that I provide taken substantially as indicated by line 3—3 on FIG. 2;

FIG. 4 is a view taken substantially as indicated by line 4—4 on FIG. 3;

FIG. 5 is a view taken substantially as indicated by line 5—5 on FIG. 3;

FIG. 6 is a view similar to FIG. 3 showing another form of my invention;

FIG. 7 is a view taken as indicated by line 7—7 on FIG. 6;

FIG. 8 is a view taken substantially as indicated by line 8—8 on FIG. 7 and showing the inner surface of one plate;

FIG. 9 is a view similar to FIGS. 3 and 6, showing a third form of my invention; and, FIG. 10 is a view taken substantially as indicated by line 10—10 on FIG. 9.

For the purpose of this disclosure, I have, in FIG. 1 and FIG. 2 of the drawings, shown a shock absorber S extending between and related to an axle housing A and an automobile frame F, spaced above the axle housing. I have shown but a portion of the axle housing and the frame and have intentionally elected not to show or illustrate further details of those elements or parts and other elements and parts of an automobile and/or a suspension system related thereto, as such structures, means and/or systems are subject to wide variations in arrangement and details of construction, and in no way effecting the novelty or spirit of this invention.

For the purpose of illustrating typical shock absorber mounting means, I have shown a lower shock absorber mounting means M on the axle housing A and an upper shock absorber mounting means M' on the frame F, which means are illustrative of one typical type of such means. Each comprises a bracket 10 having flat vertical plate portion 11. The bracket 10 is fixed to its related housing or frame with the plate portion 11 in vertical planes. The plate portion 11 carries a laterally projecting, horizontally mounting pin or shaft 12, which shaft is ordinarily in the nature of a stud having a threaded outer end portion.

In practice, another and distinct kind or type of mounting means can be and is frequently used instead of the M' shown.

In practice, when the automobile, with which the above structure is related, is operated, the axle housing is subject to limited turning about its longitudinal axis, which is normal to the axis of the frame and is subject to swinging or moving fore and aft relative to the longitudinal axis of the frame as it works vertically relative thereto. In accordance with the above, the mounting pin 12 of the means M is arranged with its axis parallel with the central axis of the axle housing and normal to the longitudinal axis of the frame and is adapted to allow for limited pivotal movement between said pin and the shock absorber S upon pivoting and/or swinging of the axle housing in the manner set forth above.

The shock absorber S is illustrative of a typical standard cylinder and piston type automotive shock absorber and includes a lower or base assembly B and an upper assembly U.

The base assembly B includes an elongate substantially vertically extending cylindrical body 20 with a substantially semi-spherical or crowned lower end 21 and a mounting ring 22 fixed to the center of said lower end with its axis normal to the longitudinal axis of the body.

The lower end 21 of the body is established by a cap-like closure engaged in the lower end of the body, which body is tubular, and is fixed therein as by welding.

The mounting ring 22 is established of a short length of tubular stock, has flat ends 23 and is fixed to the end 21 of the body as by welding.

The ring 22 is adapted to be related to the pin or shaft 12 of the means M to effect connecting the shock absorber to the axle housing. The ring 22 is larger in inside diameter than the outside diameter of the pin 12 and is adapted to normally receive a rubber grommet G, having end flanges 24 overlying the ends 23 of the ring and a central opening 25 through which the pin 12 projects.

As shown in FIG. 1 of the drawings, the outer threaded end of the pin projects through and from the grommet, carries a back-up washer for the outer end of the grommet and has a nut 26 engaged thereon, which nut is advanced to urge the grommet G and the ring 22 toward and in tight clamped engagement on the plate 11 of the mounting bracket 10 of the means M.

The upper assembly U is shown as including an elongate cylindrical shell or barrel 30 telescopically engaged with the body to extend upwardly therefrom, in axial alignment therewith. The barrel 30 is similar to the body 20 and, like the body 20, is shown as having a substantially semi-spherical or crowned upper end 31 with a mounting ring 32 fixed thereto. The ring 32 carries a grommet G' through which the mounting pin 12 of the means M' projects. The pin 12 of the means carries a back-up washer and a nut 26 which are utilized to hold the ring 32 engaged on and with the pin 12 and plate 11 of the means M' in the same manner as set forth above in considering the relationship of the means M and mounting ring 22.

The present invention provides novel extension means E for extending the effective longitudinal extent of the shock absorber S, as is required when the normal vertical spacing between axle housing and frame is increased, without requiring working upon or modifying the shock absorber or the mounting means M or M'.

In FIGS. 2 through 5 of the drawings, I have shown one preferred form of my new extension means E. The means E is shown related to and engaged between the lower end 22 of the base assembly B of the shock absorber S and the mounting means M on the axle housing A.

The extension means E is shown as including a pair of like, elongate plates P having substantially flat upper and lower portions 40 and 41 with inner opposing surfaces 42 and 43, respectively. The upper portions of the plates have orienting means O which engage the ring 22 of the shock absorbers S. The lower portions of the plates have coupling means N to cooperatively receive the grommet G normally engaged in and carried by the ring 22.

The means E further includes fastening means F to secure the plates in assembled relationship and engaged with the shock absorber ring 22 and body 20.

Finally, the means E includes stop means T engageable with the shock absorber body and serving to maintain the means E in alignment with the shock absorber and to limit or prevent relative pivoting therebetween.

The upper portions 40 of the plates P occur at the opposite ends of the ring 22 on planes normal to the axes of the ring and with their inner surfaces 42 in flat bearing engagement with the ends 23 of the ring.

The orienting means O includes projections 45 projecting in from the inner surfaces 42 and corresponding in diameter with the inside diameter of and projecting into their related ends of the ring 22.

The plates are established of mild steel and the projections 45 are in the nature of cup-like portions suitably formed therein.

The lower portions 41 of the plates P are offset relative to the upper portions 40, towards each other and have substantially flat oppositely disposed outer surfaces 46 which are spaced below and occur in common planes with the ends 23 of the ring 22.

The coupling means N is established by axially aligned openings 46 in the lower portions 41 of the plates, which openings correspond in diameter with the inside diameter of the ring 22 and cooperatively receive the grommet G. In the preferred carrying out of the invention and as illustrated, the portion of the plates in which the openings 46 are established are drawn and formed to establish annular flange-like projections 47 on the inner surfaces of the plates. The inwardly projecting annular flanges 47 define inner edges which engage each other to limit and stop inward shifting of the lower portions of the plates and are such that they cooperate with each other so that the openings 46 combine and/or cooperate to define an uninterrupted or substantially uninterrupted transverse passage (46—46) through which the grommet is engaged and in which said grommet is contained.

The stop means T is defined and/or established in and by the upper end portions of the upper portions 40 of the plates. The upper end portions of the upper portions of the plates P have central, upwardly disposed, concaved upper edges or recesses 48 that oppose and preferably cooperatively engage about and bear against opposite side portions of the lower end 21 of the shock absorber body 20 and have laterally inwardly turned corners defining stop tabs or ears 49 with substantially upwardly disposed stop edges 50. The ears occur on planes parallel with the central axis of the mounting ring 22 with their edges 50 stopped against opposite sides of the lower end 21 of the body 20.

With the structure set forth above, it will be apparent that the means T effectively maintains the longitudinal axes of the means E (extension E) and the shock absorber S in axial alignment.

The fastening means F that I provide includes axially aligned fasterner receiving openings 51 in the central portions of the plates, between the upper and lower portions thereof, a headed bolt 52 engaged through the openings 51 and a nut 53 engaged on the bolt and advanced thereon to hold the plates in tight clamped engagement with each other and with the ring 22.

In the preferred carrying out of the invention, the means F further includes axially aligned fastener receiving openings 54 in the upper portions of the plates concentric with the means O, a headed bolt 55 engaged through the openings 54 and through the ring 22 and a nut 56 on the bolt 55 and advanced to urge and hold the upper portions of the plates clamped with their related ends of the ring 23 and the means O engaged in and with said ring. In the case illustrated, the openings 54 are established in the round projections of the means O and suitable back-up washers 57 are engaged in the outwardly disposed recesses defined by the projections and on the bolt 55.

The mounting pin 12 of the mounting means M is engaged through the grommet G in the means N, with a back-up washer 60, engaged on at least the outer end of the pin and against the adjacent outer end of the grommet G. A nut 61 is engaged on the outer end of the pin 12 and is advanced into engagement with the washer 60 and so that the grommet G is stopped against the flange 11 of the mounting bracket and compacted and distended into tight engagement in and with the openings or passage 46—46 of the means N.

In practice, a second back-up wahser 60' can be engaged on the pin between the plate 11 and the grommet G.

The mounting bracket 10, pin 12, grommet G and washers 60 and the nut 61 also serve to hold the plates assembled and can be considered a part of or supplemental to the means F.

With the structure described above, it will be apparent that the effective length of the shock absorber S is easily, economically, effectively and safely extended.

In FIGS. 6, 7 and 8 of the drawings, I have shown another form and carrying out of my invention. In this form of the invention the extension E' involves a pair of like plates P', which plates are cast or forged of steel and like the plates P in the first form of the invention, have upper and lower portions.

The extension E', like the first form of the invention, includes orienting means O', coupling means N', stop means T' and fastening means F'.

The extension or extension means E' is essentially the same as the extension E in the first form of the invention, except for, or with the following exceptions: (1) the orienting means O' includes annular radially inwardly disposed shoulders 70 in spaced relationship about the lower portions or halves of the orienting projections 45'(which is cast into the plates) and which engage the lower portions of the related end portions of the ring 22; (2) the fastening means F' only includes the bolt 55' and nut 56' related to the orienting means O' and the plate 11, pin 12, grommet G, washer 60' and nut 61' related to the means N'; and, (3) the stop means T' includes an upwardly opening, substantially concaved socket 75 defined by opposite and opposing upwardly and laterally inwardly opening simespherical recesses 76 formed in the upper end portions of the plates P' and in which the lower end 21 of the shock absorber body 20 is cooperatively engaged and seated.

In all other respects, the means or extension E' is essentially the same as the means E and further detailed description and consideration thereof can and will be dispensed with.

In FIGS. 9 and 10 of the drawings I have shown yet another and third form of my invention.

This third form of my invention is identical to the first form of the invention except for the stop means $T^2$ at the upper ends of the plates $P^2$.

The stop means $T^2$ includes a laterally inwardly and upwardly projecting flange 80 on one side of each plate $P^2$, the upper portions of which project upwardly above the upper ends of the plates to occur in spaced relationship from opposite sides of the lower end portion of the shock absorber body 20 and having threaded fastener receiving openings 81 in their upper end portions, on axes intersecting the central longitudinal axis of the body 20 on a plane normal to the plane on which the axis of the mounting ring 22 occurs.

A stop screw 82, in the form of a headed bolt, is engaged in each opening 81, from the outside thereof and is advanced to engage and establish stopped engagement with its opposing side of the body 20, thereby holding the body 20 and the assembled plates with their central longitudinal axes in line.

In practice, the flanges 80 are strengthened and supported by suitable gussets 83 formed integrally therewith and with the upper ends of the plates and as clearly illustrated in the drawings.

In each form of the invention, the stop means T establish and/or provide structure in fixed relationship on the plates which engage and stop against a portion of the shock absorber body at points spaced radially from the axis of ring 22, orienting means O and fastening means F related thereto. Such contact occurs on a plane radial to the noted axis and at opposite sides of the body. With such a relationship of parts, it will be apparent that the assembled plates cannot turn or pivot about the axis of the mounting ring 22 and that the axes of the extension and of the shock absorber are effectively maintained aligned.

While I have shown the shock absorber and extension related to an axle housing and frame, it will be apparent that the assembled shock absorber and extension can be related to and extend between any spaced, relatively movable support structures between which shock absorbers of the character here involved are commonly engaged.

Having described only typical preferred forms and applications of my invention, I do not wish to be limited or restricted to the specific details herein set forth, but wish to reserve to myself any modifications and/or variations that may appear to those skilled in the art to which this invention pertains.

Having described my invention, I claim:

1. In combination, vertically spaced relatively vertically shiftable upper and lower structures; a cylinder and piston type shock absorber having an elongate substantially vertically extending top assembly, mounting means securing the upper end of the top assembly to the upper structure, an elongate substantially vertically extending base assembly including an elongate cylindrical body telescopically engaged with the top assembly and having a crowned lower end and an annular mounting ring fixed to the center of the lower end with its central axis normal to the central axis of the body and adapted to normally receive a horizontal mounting pin on the lower structure, an extension for and extending axially downwardly from the lower end of the shock absorber and including a pair of elongate vertical plates with laterally spaced upper and lower portions, the upper portions occurring adjacent the opposite ends of the ring and having orienting means engaging said ring to maintain the plates in predetermined position relative thereto, the lower portions having axially aligned openings spaced below the ring and receiving the mounting pin, fastening means releasably securing the plates together and in clamped engagement with the ring and stop means maintaining the shock absorber and the extension in longitudinal alignment and including means at the upper ends of the plates engaging opposite sides of the body at points spaced above and on a plane radial to the axis of the ring.

2. A structure as set forth in claim 1 wherein said orienting means includes circular inwardly extending projections on the plates engaged in the ends of the ring.

3. A structure as set forth in claim 1 wherein said orienting means includes circular inwardly extending projections on the plates engaged in the ends of the ring, and semi-circular, radially inwardly disposed shoulders spaced radially from and about a portion of each projection and engaged about the exterior of the ends of the ring related thereto.

4. A structure as set forth in claim 1 wherein the stop means includes inwardly turned ears on the plates above and at opposite sides of the orienting means and the ring and having upper edges engaging the lower end of the body.

5. A structure as set forth in claim 1 wherein the stop means includes upwardly and laterally inwardly opening recesses in the upper portions of the plates above said orienting means and engaged with and about the lower portion of the body adjacent thereto.

6. A structure as set forth in claim 1 wherein the stop means includes a flange on each plate on a plane parallel with the axis of the orienting means and ring and projecting above the orienting means and ring to occur in spaced relationship from a related side of the body and a stop screw carried by the flange and engaging said related side of the body.

7. A structure as set forth in claim 1 wherein said fastening means includes aligned fastener openings in the plates in axial alignment with the orienting means and the ring and screw fastening means engaged in and through said fastener openings.

8. A structure as set forth in claim 1 wherein said orienting means includes circular inwardly extending projections on the plates engaged in the ends of the ring and said stop means includes inwardly turned ears on the plates above and at opposite sides of the orienting means and the ring and having upper edges engaging the lower end of the body.

9. A structure as set forth in claim 1 wherein said orienting means includes circular inwardly extending projections on the plates engaged in the ends of the ring and said stop means includes inwardly turned ears on the plates above and at opposite sides of the orienting means and the ring and having upper edges engaging the lower end of the body and said fastening means includes aligned fastener openings in the plates in axial alignment with the orienting means and the ring and screw fastening means engaged in and through said fastener openings.

10. A structure as set forth in claim 1 including an elongate rubber grommet about the pin and engaged in and through the openings in the lower portions of the plates, said pin having a flat axially disposed surface at one end opposing one end of the grommet, a backup washer on the pin adjacent the other end of the grommet and a nut engaged on the pin and against the washer.

* * * * *